US008167096B2

(12) United States Patent
Ganzhorn et al.

(10) Patent No.: US 8,167,096 B2
(45) Date of Patent: May 1, 2012

(54) ELECTROMECHANICALLY OR PNEUMATICALLY ACTUABLE DISC BRAKE, IN PARTICULAR FOR A COMMERCIAL VEHICLE

(75) Inventors: Dirk Ganzhorn, Munich (DE); Johann Baumgartner, Moosburg (DE); Robert Trimpe, Wessling (DE); Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 645 days.

(21) Appl. No.: 11/705,006

(22) Filed: Feb. 12, 2007

(65) Prior Publication Data

US 2008/0029353 A1 Feb. 7, 2008

Related U.S. Application Data

(63) Continuation of application No. PCT/EP2005/008620, filed on Aug. 9, 2005.

(30) Foreign Application Priority Data

Aug. 12, 2004 (DE) .......................... 10 2004 039 141

(51) Int. Cl.
*F16D 65/46* (2006.01)
(52) U.S. Cl. .................................... 188/73.38; 188/71.9
(58) Field of Classification Search .................. None
See application file for complete search history.

(56) References Cited

U.S. PATENT DOCUMENTS

| 3,486,589 A | | 12/1969 | Hillegass | |
|---|---|---|---|---|
| 3,771,625 A | * | 11/1973 | Martins | |
| 4,467,897 A | * | 8/1984 | Kubo et al. | 188/73.38 |
| 4,513,844 A | * | 4/1985 | Hoffman, Jr. | 188/71.6 |
| 5,014,827 A | * | 5/1991 | Wang et al. | 188/72.4 |
| 5,494,140 A | * | 2/1996 | Weiler et al. | 188/73.38 |
| 5,509,508 A | | 4/1996 | Evans | 188/73.38 |
| 5,701,978 A | * | 12/1997 | Weiler et al. | 188/73.32 |
| 5,704,452 A | * | 1/1998 | Maligne | 188/73.38 |
| 5,706,916 A | * | 1/1998 | Cortes Guasch et al. | 188/73.38 |
| 5,860,495 A | * | 1/1999 | Weiler et al. | 188/73.38 |
| 5,934,417 A | * | 8/1999 | Kobayashi et al. | 188/72.3 |
| 6,318,514 B1 | * | 11/2001 | Hinkens et al. | 188/73.38 |
| 6,336,531 B1 | | 1/2002 | Chou | |

(Continued)

FOREIGN PATENT DOCUMENTS

DE 43 24 988 A1 2/1995

(Continued)

OTHER PUBLICATIONS

International Search Report dated Nov. 30, 2005.

*Primary Examiner* — Bradley King
*Assistant Examiner* — Thomas Irvin
(74) *Attorney, Agent, or Firm* — Crowell & Moring LLP

(57) ABSTRACT

An electromechanically or pneumatically operable disc brake, particularly for a commercial vehicle, includes a brake caliper, which straddles a brake disc, a brake application device arranged in the brake caliper, and at least one electromechanically drivable adjusting device for adjusting a clearance between the brake pads and the brake disc. In order to operate the adjusting device, an electric motor is actively connected to the assigned brake pistons. The disc brake is designed such that the brake pistons are connected to the respective brake pad via spring elements that can be displaced in a direction of displacement.

16 Claims, 4 Drawing Sheets

U.S. PATENT DOCUMENTS

| | | | |
|---|---|---|---|
| 6,598,714 B1 * | 7/2003 | Rinsma et al. | 188/71.9 |
| 6,634,469 B2 | 10/2003 | Stoerzel et al. | |
| 2002/0043436 A1 * | 4/2002 | Burgdorf et al. | 188/73.38 |
| 2002/0096404 A1 * | 7/2002 | Storzel et al. | 188/73.38 |
| 2005/0194222 A1 * | 9/2005 | Stickney et al. | 188/73.38 |

FOREIGN PATENT DOCUMENTS

| | | |
|---|---|---|
| DE | 101 36 235 A1 | 7/2002 |
| WO | WO 02/14708 A2 | 2/2002 |
| WO | WO 2004/013510 A2 | 2/2004 |

* cited by examiner

ELECTROMECHANICALLY OR PNEUMATICALLY ACTUABLE DISC BRAKE, IN PARTICULAR FOR A COMMERCIAL VEHICLE

CROSS-REFERENCE TO RELATED APPLICATIONS

This application is a continuation of PCT International Application No. PCT/EP2005/008620, filed on Aug. 9, 2005, which claims priority under 35 U.S.C. §119 to German Application No. 10 2004 039 141.6, filed Aug. 12, 2004, the entire disclosures of which are expressly incorporated by reference herein.

BACKGROUND AND SUMMARY OF THE INVENTION

The present invention relates to an electromechanically or pneumatically actuable disc brake, in particular for a commercial vehicle.

A generic disc brake is known from WO 02/14708, which disc brake can be embodied as a sliding caliper brake, a pivoting caliper brake and/or as a fixed caliper brake with a stationary or moveable, in particular displaceable, brake disc.

During braking, an actuation of the brake application device takes place, during which, in the case of a fixed caliper brake, initially the application-side brake lining is pressed against the brake disc and then the moveable brake disc is pressed against the reaction-side brake lining.

Here, the application-side brake lining is displaced by one, or preferably two, brake pistons which engage thereon. The brake pistons, on the other hand, function as adjustment pistons as constituent parts of adjustment devices, by which an air play between the brake pads and the brake disc can be set. Adjustment devices on both sides of the brake disc reduce the path which the disc and/or caliper must move through, since the wear travel can be compensated by way of the adjustment devices alone.

In WO 02/14708, the adjustment devices on one or both sides are, preferably, driven electromechanically, with the electric motor being designed such that the brake piston can move the brake lining towards and away from the brake disc by use of pressure pieces.

As a result, in particular of the often very harsh operating conditions under which the disc brakes are used, the functional capability of the disc brakes can under certain circumstances be restricted, that is to say operational readiness is not optimally provided at all times and under all conditions.

The resulting problems include that it is not always ensured that the brake linings are released from the brake disc, in particular when the brake linings are, so to speak, "baked" on to the brake disc as a result of corrosion.

In addition to the very high degree of wear of the brake disc and/or of the brake linings caused as a result, the functional safety of the disc brake can also be adversely affected under some circumstances without corresponding countermeasures being taken.

Here, the adhesion forces with which the brake linings adhere to the brake disc as a result of corrosion can be so large that the return force of the electric motor of the adjustment device alone is not sufficient to release the brake linings from the brake disc.

However, even in the case where the brake linings release from the brake disc, a defined release is desired, in particular when the brake disc is mounted in an axially moveable fashion such as in the case of a fixed caliper brake. As a result of the undefined position of the brake disc and/or of the brake caliper in a sliding caliper brake, it is not possible to entirely prevent the brake linings from grinding against the brake disc.

This naturally leads to an increased degree of wear both of the brake linings and of the brake disc, which hinders an optimum service life of the disc brake.

In addition, the increased driving resistance resulting from the friction of the corresponding components in the unbraked position leads to increased fuel consumption, which also hinders the desire to minimize operating costs.

The present invention is, therefore, based on the need to further develop a disc brake of the above-mentioned type in such a way as to improve its operational reliability.

This, and other, needs are provided according to the invention by an electromechanically or pneumatically actuable disc brake, in particular for a commercial vehicle, having a brake caliper which engages over a brake disc, a brake application device, which is arranged in the brake caliper, for applying the brake by way of at least one, or a plurality of, brake pistons which each bear against brake pads having brake linings, at least one electromechanically drivable adjustment device for adjusting an air play between the brake pads and a brake disc, wherein an electric motor is preferably operatively connected to the associated brake piston for operating the adjustment device. The at least one brake piston and/or the pressure piece is arranged, so as to be releasable to a limited extent, on the associated brake pad by way of spring elements, which are deflectable in the displacement direction.

According to the invention, the at least one brake piston and/or the pressure piece is arranged, so as to be releasable to a limited extent, on the associated brake pad by way of spring elements, which can deflect in the displacement direction. In the case of adjustment devices being arranged on both sides of the brake disc, such an arrangement is preferably provided on both sides of the brake disc.

It is achieved according to the invention that the brake piston, together with pressure pieces, can be released to a limited extent from the brake pads at all times, that is to say even when the return forces of the electric motor of the adjustment device are not sufficient to release the brake pads, which are fixedly adhered to the brake disc.

In a worst case, there is grinding contact between the brake pad and the brake disc, but never a situation in which the brake pistons are prevented from releasing from the brake disc.

Normally, the vibrations which occur during normal driving operation are sufficient to separate the brake pads. This, of course, also includes their return movement, which requires free mobility in the direction away from the brake disc, and is now provided.

For fault-free, that is to say "normal" functioning, the brake piston assigned to the spring element bears against the brake pad under a preload of the spring element, so that a so-called elastic connection is provided between the brake piston and the brake pad, which is released only in a certain dimensional range, when the return forces of the electric motor are not sufficient to release the brake pads from their frictional position.

Here, the spring element, preferably a clamping spring embodied as a leaf spring, is dimensioned such that the spring force is lower than the return forces of the electric motor which drives the brake piston.

A mechanical retraction block is preferably provided for delimiting the return path of the brake piston, which retraction block delimits the stroke of the electric motor, so that a maximum value of the air play is not exceeded, since the brake could otherwise become ineffective.

In order that the functional capability of the retraction block is not adversely affected, when the brake pad does not release from the brake disc after the preload force has been overcome by the return of the electric motor, the spring element preferably bears against a stop (or itself forms a path-delimiting stop), whose distance from the spring element in the normal position is determined by the maximum permitted air play. Since the spring path is delimited by the stop, the adjustability of the brake piston together with the pressure piece is likewise delimited, with the maximum air play dimension between the brake piston and the brake pad corresponding to that between the brake pad or its friction face and the brake disc in the case that the brake pad is released correctly from the brake disc.

According to an advantageous aspect of the invention, a stop is arranged on a positionally fixed component, against which stop the brake disc and/or the brake caliper bears under elastic preload in the released state of the brake.

This ensures that, when the brake application device is released, a free play between the brake pads and the brake disc is inevitably formed by the elastic force, with the result that grinding of the brake disc against the brake pads during driving, and the resulting increased degree of wear and increased fuel consumption, are prevented.

Other objects, advantages and novel features of the present invention will become apparent from the following detailed description of the invention when considered in conjunction with the accompanying drawings.

BRIEF DESCRIPTION OF THE DRAWINGS

Exemplary embodiments of the invention are described in the following on the basis of the appended drawings, in which.

DETAILED DESCRIPTION OF THE DRAWINGS

Figure 1:
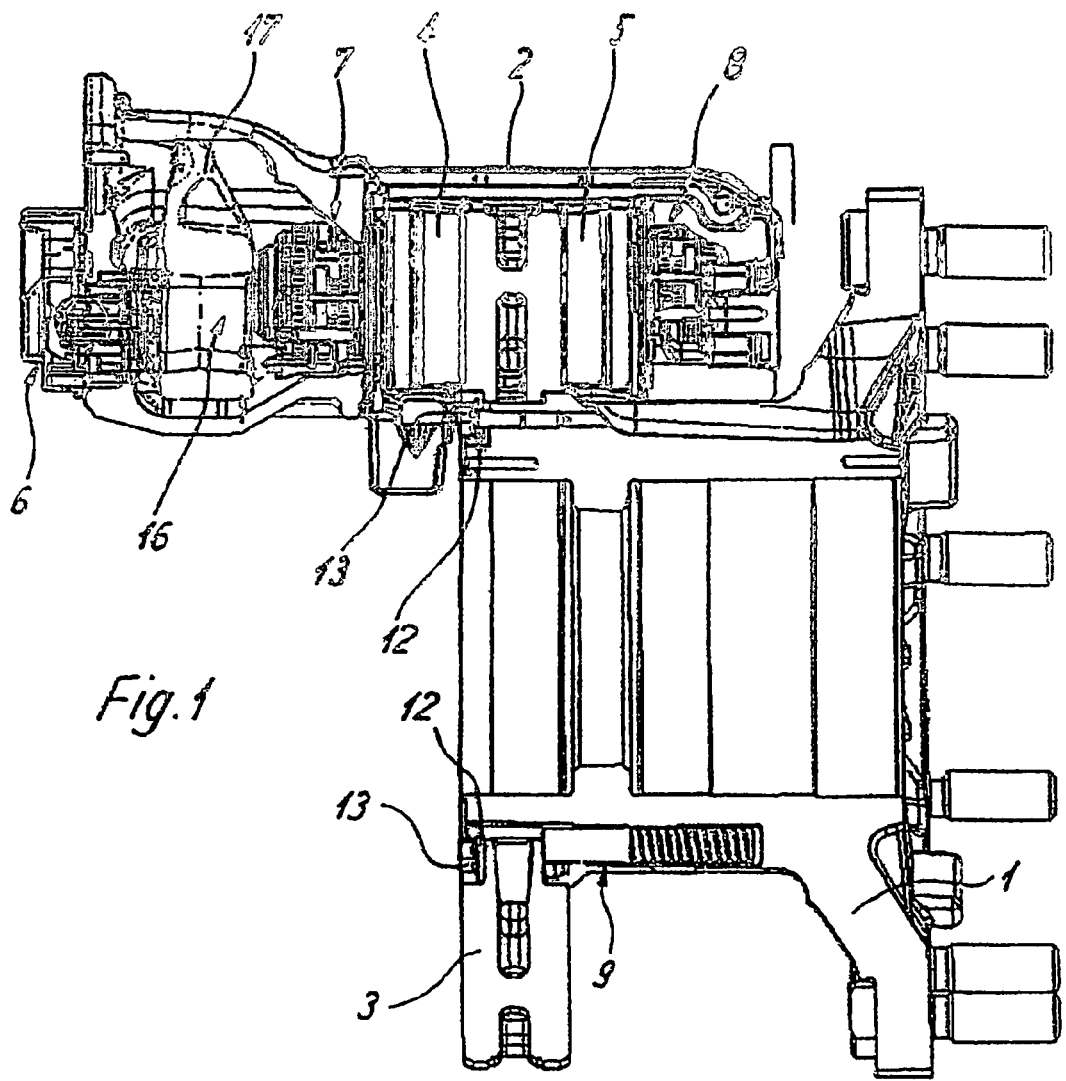
FIG. 1 shows a disc brake in a sectioned schematic side view.

FIG. 1 illustrates a disc brake, embodied here by way of example as a fixed caliper brake, for commercial vehicles, which disc brake has a brake caliper 2, embodied as a fixed caliper, which straddles a brake disc 3, which is arranged in an axially displaceable and rotationally fixed manner on a vehicle part embodied as an axle flange 1, to which the brake caliper 2 is also fixed in an unmovable manner.

Arranged in the brake caliper 2 is a brake application device 16, which can be actuated by a piston rod of a brake operating cylinder (not shown). The brake application device includes a rotary lever 17 mounted eccentrically in the brake caliper 1, which rotary lever 17 is designed and constructed such that, as the rotary lever 17 is pivoted by the piston rod, the brake pistons 14 (see FIGS. 2-4 for more clarity) are displaced parallel to the brake disc axis and, by way of attached pressure pieces 18 (FIGS. 2-4) on the side of the brake disc 3 (referred to as the application side), press a brake pad 4 arranged on the application side against the brake disc 3. During the continued application movement axially in the direction of the further, other side (reaction side) of the brake disc 3, the brake disc moves until it comes into contact there and the actual braking action is generated between the brake disc 3 and the brake pads 4, 5. As a result of the frictional contact of the two brake pads 4, 5 (composed of lining carrier plates and lining material), the brake disc 3 (and with it the axle flange 1 and the wheel hub attached thereto, along with a wheel (not illustrated)), are braked.

The two brake pads 4, 5 are assigned, at the application side and the reaction side in each case, at least one, in particular two adjustment devices 7, 8, by which operational wear of the brake pads 4, 5 can be compensated, that is to say the brake pads 4, 5 are adjusted in the direction of the brake disc 3 by the wear thickness, for example after each braking operation or after a plurality of braking operations.

The wear adjustment devices are driven electromechanically, with in each case one electric motor 6 being provided on each side of the brake disc 3. The electric motor 6 acts by way of a drive connection on the brake pistons 14, which then act as adjusting pistons and, as they rotate, change the axial position of the pressure pieces 18 relative to the brake disc 3.

Figure 2:
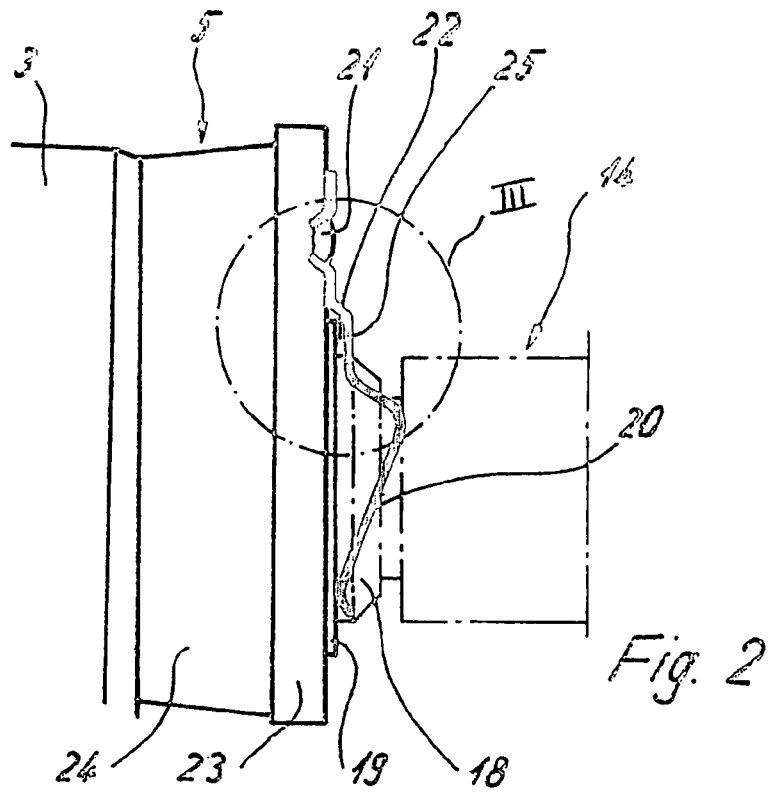
FIG. 2 shows a detail of the disc brake in a schematic side view.
Figure 3:
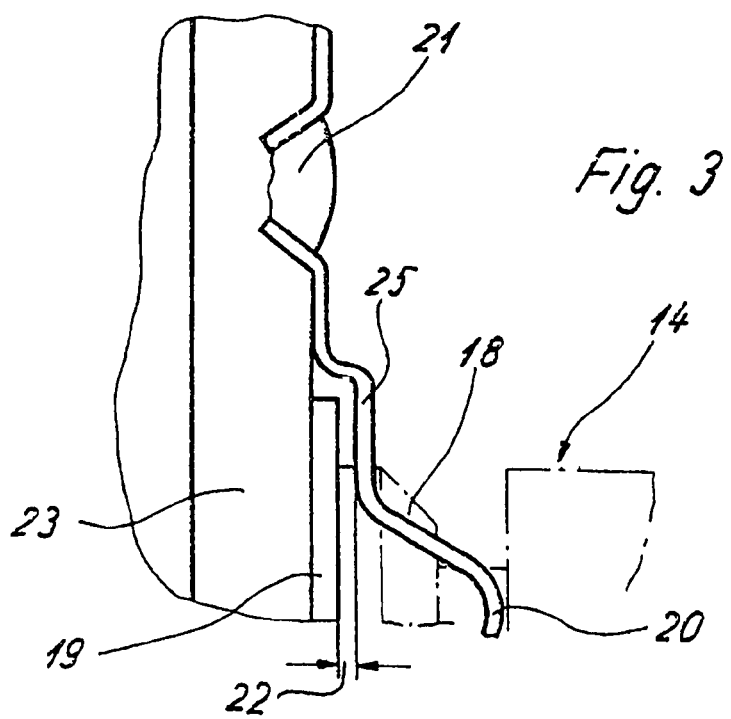
FIG. 3 shows an enlarged section as per the area III in FIG. 2.
Figure 4:
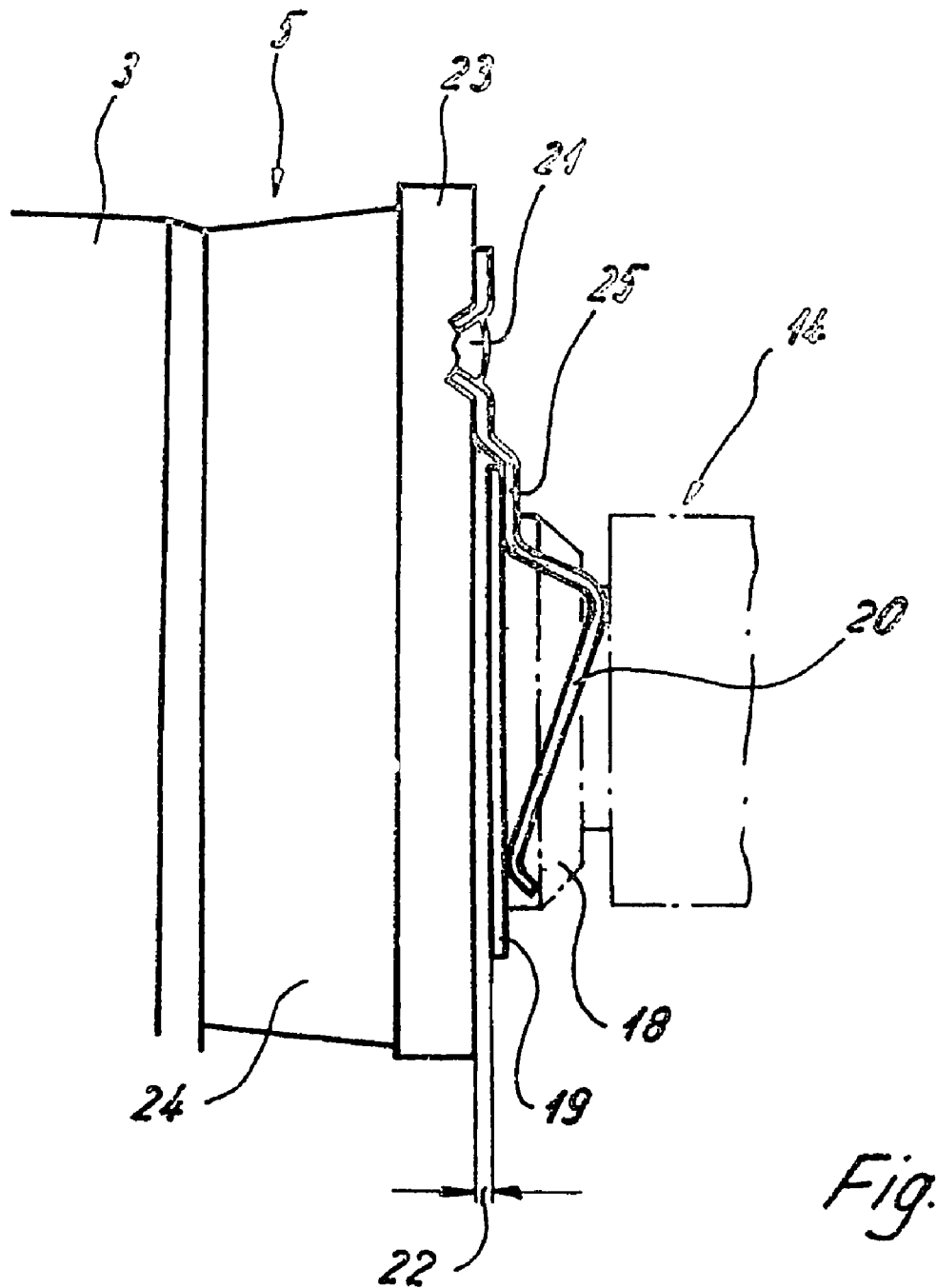
FIG. 4 shows the detail as per FIG. 2 in a different operating position of the disc brake.

As can be clearly seen from FIGS. 2 to 4, the brake pistons 14 (or pressure pieces assigned thereto) are held against the associated brake pad 4, 5 by way of a spring element 20, which can deflect in the displacement direction. The spring element 20 is in the form of a clamping spring. The spring element 20 is fixedly connected by way of a rivet 21 or the like to the brake pad 5, specifically to a lining carrier plate 23 which carries a brake lining 24 that comes into contact with the brake disc 3 in the braking position. The spring element 20 bears, under preload, against a pressure plate 19 which is fastened to the pressure piece 18.

In FIGS. 2 and 3, the brake pad 5 is pressed against the brake disc 3 with the pressure plate 19 in contact with the lining carrier plate 23.

The spring element 20 is formed so as to act, in a region which partially overlaps an edge region of the pressure plate 19, as a path-limiting stop 25 which, in the "normal position", runs at a distance from the pressure plate 19, with the distance forming the air play denoted by the reference symbol 22.

By returning the brake pistons 14, the associated brake pads 4, 5 are moved out of their contact position with the brake disc 3. Here, the preload of the spring element 20 is sufficient to transmit the force required to return the brake pads 4, 5. If, however, the respective brake pad 4, 5, for example, adheres to the brake disc 3 as a result of corrosion such that the return forces of the electric motor are not sufficient to release the brake, the brake piston 14 with the associated pressure plate 19 is raised from the brake pads 4, 5 so as to overcome the preload force of the spring element 20.

In order to delimit the return stroke over a dimension defined by the maximum air play 22, the pressure plate 19 bears, in its end position, against the stop 25, as illustrated in FIG. 4. Here, although the brake lining 24 continues to grind against the brake disc 3, it does so without pressure as a result of the brake pistons 14 having been released, so that the disc brake is prevented from overheating.

Figure 5:
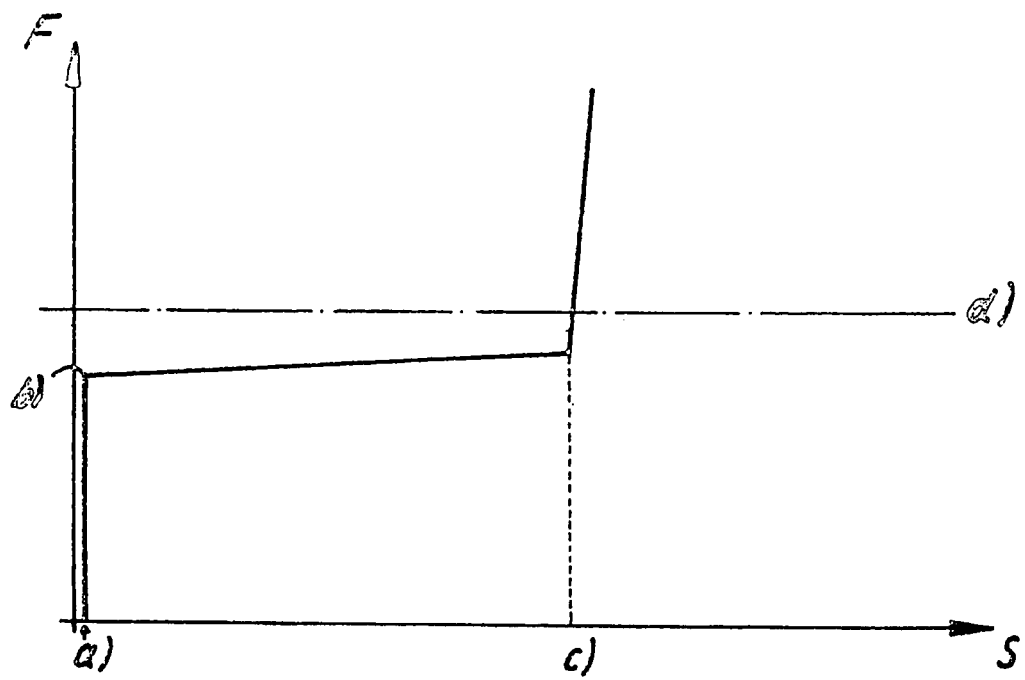
FIG. 5 shows a diagram illustrating the operation of the invention.

The diagram illustrated in FIG. 5 illustrates the described delimitation of the deflection of the spring element 20 or the dependency of the air play 22 to the force of the spring element 20. Here, the abscissa represents the dimension S of the air play, while the ordinate shows the force F of the spring element. Point a) illustrates the blocking position, and point b) illustrates the preload force of the spring element 20. Point c) denotes the maximum permitted air play, and line d) illustrates the maximum return force of the adjustment device or of the electric motor.

Figure 6:
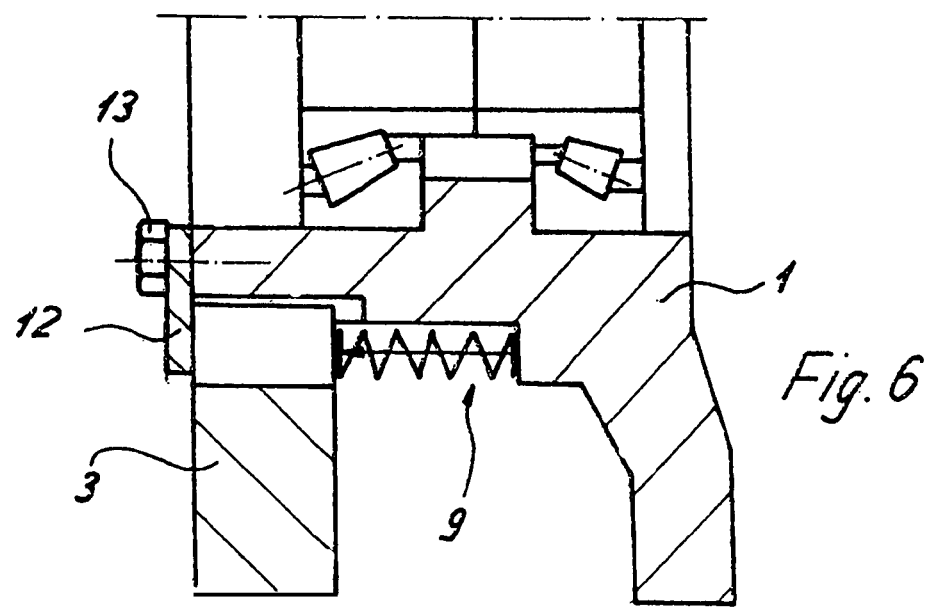
FIG. 6 shows a further detail of the disc brake, likewise in a schematic side view.

In order to ensure that the brake disc 3 is displaced back into its initial position after the end of the braking process, so that sufficient air play is generated between the outer brake pad 5 and the brake disc 3, pressure elements 9, which are resilient in the displacement direction of the brake disc 3 are provided, as can be seen in FIG. 6, with the brake disc 3 bearing against the pressure elements 9.

The displacement of the brake disc caused by the pressure elements 9 is delimited by stationary stops 12, which are held by screws 13 that are screwed into the axle flange 1.

TABLE OF REFERENCE NUMBERS

1 Axle flange
2 Brake caliper
3 Brake disc
4 Brake pad
5 Brake pad
6 Electric motor
7 Adjustment device
8 Adjustment device
9 Pressure element
12 Stop
13 Screw
14 Brake piston
16 Brake application device
17 Rotary lever
18 Pressure piece
19 Pressure plate
20 Spring element
21 Rivet
22 Air play
23 Lining carrier plate
24 Brake lining
25 Stop The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc on each side of which are arranged a respective brake pad having a brake lining, comprising:
    a caliper which straddles the brake disc;
    a brake application device arranged in the caliper for applying braking force via at least one brake piston which bears against a respective brake pad;
    at least one electromechanically drivable wear adjustment device for adjusting an air play between the brake pads and the brake disc, wherein an electric motor is operatively coupled to the brake piston for operating the wear adjustment device;
    a spring element deflectable in a displacement direction of the brake piston, the spring element being operatively configured to bias the brake piston away from engaging the associated brake pad;
    wherein the spring element is preloaded against the brake piston, a preload force of the spring element being lower than a return force of the electric motor which actuates the brake piston.

2. The disc brake according to claim 1, wherein the brake piston has a pressure piece at one end for engaging against the brake pad, the spring element being preloaded against the pressure piece.

3. The disc brake according to claim 1, wherein the disc brake is one of an electromechanically and pneumatically actuable disc brake for a commercial vehicle.

4. The disc brake according to claim 1, wherein the spring element is a clamping spring supported via one limb directly or indirectly against the brake piston and fixedly connected via another limb to the associated brake pad.

5. The disc brake according to claim 4, wherein the spring element is supported against a pressure plate of the brake piston.

6. The disc brake according to claim 1, further comprising a stop operatively configured to delimit a deflection of the spring element in a direction away from the brake disc.

7. The disc brake according to claim 6, wherein the spring element is operatively configured to act as the stop.

8. The disc brake according to claim 7, wherein a distance between the stop and a pressure plate arranged at one end of the brake piston, when the pressure piece is in contact with the brake pad, corresponds to a maximum permitted air play.

9. The disc brake according to claim 1, wherein the spring element is formed of a spring steel sheet.

10. The disc brake according to claim 6, wherein the stop partially overlaps an edge region of a pressure plate that engages against the brake pad when the braking force is applied.

11. The disc brake according to claim 1, further comprising a brake disc stop against which at least one of the brake disc and the caliper bear under elastic preload in a released state of the disc brake.

12. A disc brake component for an electromechanically or pneumatically actuable disc brake having a brake disc, the disc brake applying a braking force via a brake application device having a brake piston arranged on one side of the brake disc in a caliper of the disc brake, the disc brake component comprising:
    a brake pad having a lining carrier plate on one side of which is arranged brake lining material that engages against a surface of the brake disc when the braking force is applied;
    a spring element fixedly secured on the other side of the lining carrier plate, the spring element being deflectable in a displacement direction of the brake pad; and
    wherein the spring element is operatively configured to bear under preload when in use against one of the brake piston and pressure plate of the brake piston to bias the brake pad away from the brake piston, a preload force being lower than a return force of an electric motor driven wear adjustment that actuates the one of the brake piston and pressure plate.

13. The disc brake component according to claim 12, wherein the spring element is fixedly connected to the other side of the lining carrier plate via a rivet.

14. The disc brake component according to claim 12, wherein the spring element is operatively configured to form a stop provided to delimit a deflection of the spring element in a direction away from the brake disc when in use.

15. The disc brake component according to claim 14, wherein the spring element is operatively configured such that the stop partially overlaps an edge region of the pressure plate when in use.

16. The disc brake component according to claim 12, wherein the spring element is a spring steel clamping spring.

* * * * *